(12) United States Patent
Saksena

(10) Patent No.: US 8,111,072 B2
(45) Date of Patent: *Feb. 7, 2012

(54) STEAM COOKER AND RELATED SUPERHEATER

(75) Inventor: Atul Saksena, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 839 days.

This patent is subject to a terminal disclaimer.

(21) Appl. No.: 12/172,898

(22) Filed: Jul. 14, 2008

(65) Prior Publication Data

US 2008/0271612 A1 Nov. 6, 2008

Related U.S. Application Data

(63) Continuation of application No. 10/955,137, filed on Sep. 30, 2004, now Pat. No. 7,418,960.

(51) Int. Cl.
*G01R 31/08* (2006.01)
(52) U.S. Cl. .................................................... 324/522
(58) Field of Classification Search ............... 99/410; 126/369, 5

See application file for complete search history.

(56) References Cited

U.S. PATENT DOCUMENTS

| | | | |
|---|---|---|---|
| 293,048 A | 2/1800 | Maxim | |
| 82,557 A | 9/1868 | Savage | |
| 2,089,411 A | 1/1900 | Olsson et al. | |
| 2,300,782 A | 10/1900 | Gollmer | |
| 2,530,519 A | 10/1900 | Guggenheim | |
| 1,659,806 A | 7/1925 | Calkins | |
| 1,955,289 A | 7/1932 | Greenfield | |
| 2,428,481 A | 10/1947 | Wagner | |
| 2,906,258 A | 6/1954 | Parker | |
| 3,780,705 A * | 12/1973 | Le Febve de Vivy | 122/451 R |
| 3,814,901 A * | 6/1974 | Morhack | 219/401 |
| 3,828,738 A | 8/1974 | Frei | |
| 4,011,805 A | 3/1977 | Vegh et al. | |
| 4,242,989 A | 1/1981 | Chamberlain | |
| 4,460,822 A | 7/1984 | Alden et al. | |
| 4,531,479 A | 7/1985 | Gilbert | |
| 4,582,025 A | 4/1986 | Grasso | |
| 4,617,908 A | 10/1986 | Miller et al. | |
| 4,619,224 A | 10/1986 | Takita et al. | |
| 5,014,679 A | 5/1991 | Childs et al. | |
| 5,169,291 A | 12/1992 | Zebuhr | |
| 5,215,000 A | 6/1993 | Desage et al. | |
| 5,242,015 A | 9/1993 | Saperstein et al. | |
| 5,355,840 A | 10/1994 | Violi | |
| 5,649,476 A | 7/1997 | Montagnino et al. | |
| 5,857,623 A | 1/1999 | Miller et al. | |
| 6,040,564 A | 3/2000 | Ueda et al. | |
| 6,055,945 A | 5/2000 | Simoni | |
| 6,131,504 A * | 10/2000 | Imamura et al. | 99/330 |

(Continued)

FOREIGN PATENT DOCUMENTS

EP     1662 205     5/2006

*Primary Examiner* — Patrick Assouad
*Assistant Examiner* — Kathryn Chang
(74) *Attorney, Agent, or Firm* — Thompson Hine LLP

(57) ABSTRACT

A steam cooker includes a steam generator including a heating chamber defining a volume for holding water. A heat exchanger is associated with the heating chamber so as to generate steam. A steam superheater superheats steam traveling from the heating chamber to a steam cooking chamber.

10 Claims, 3 Drawing Sheets

U.S. PATENT DOCUMENTS

| | | |
|---|---|---|
| 6,237,469 B1 * | 5/2001 | Stritzl et al. .................... 99/330 |
| RE37,240 E | 6/2001 | Moore, Jr. et al. |
| 6,289,852 B1 | 9/2001 | Murgu et al. |
| 6,688,329 B2 | 2/2004 | Murray et al. |
| 7,418,960 B2 * | 9/2008 | Saksena ........................ 126/369 |
| 2002/0144662 A1 * | 10/2002 | Kemp et al. ................ 122/448.2 |

* cited by examiner

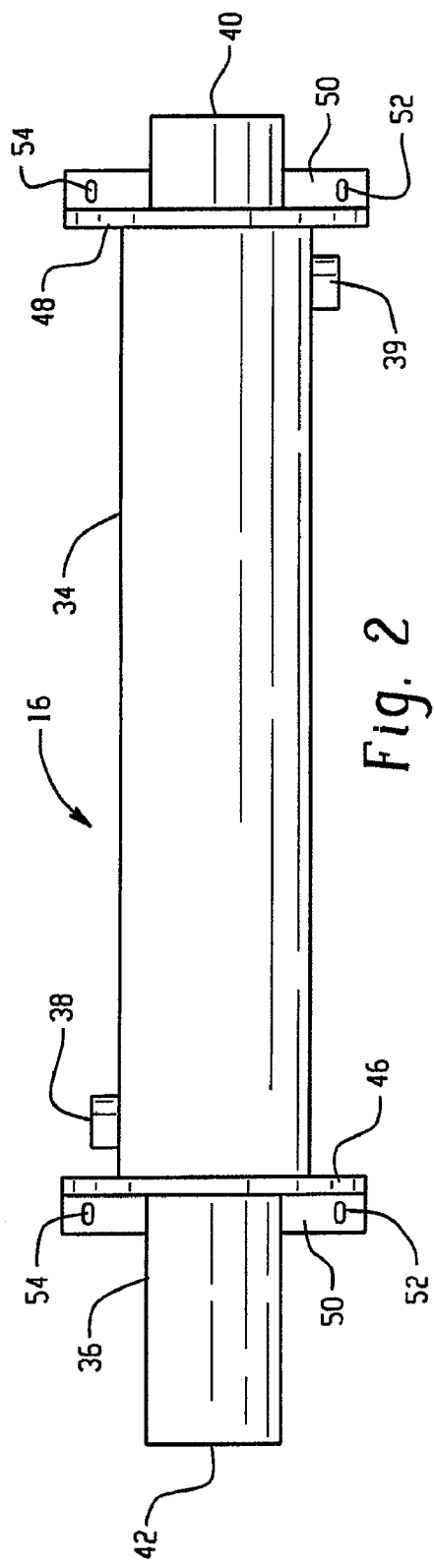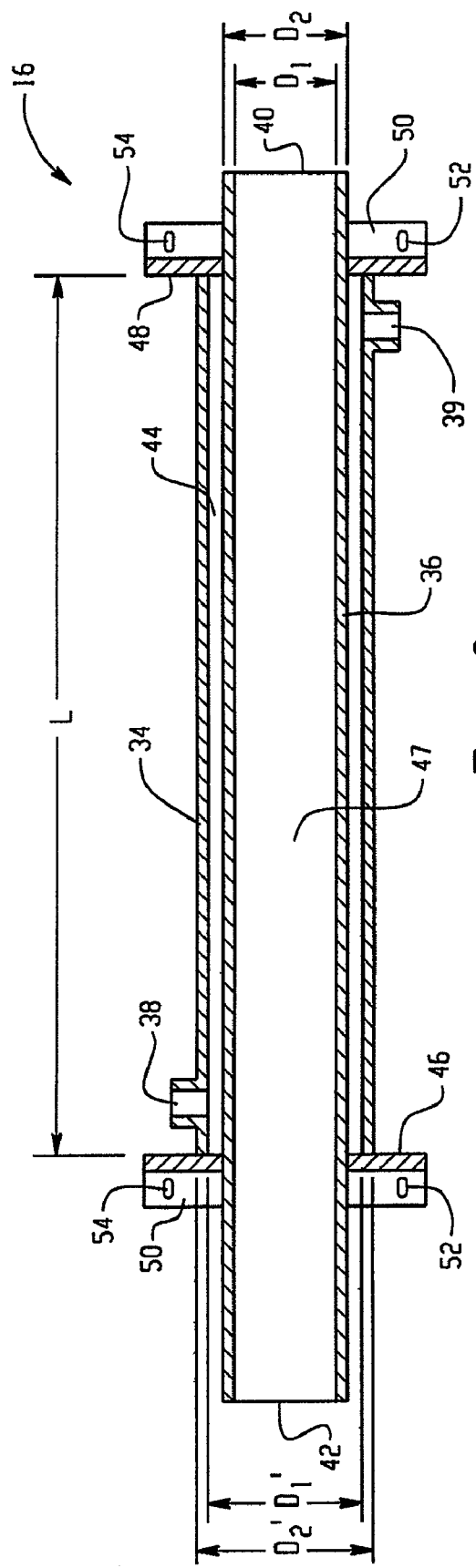

STEAM COOKER AND RELATED SUPERHEATER

CROSS-REFERENCE TO RELATED APPLICATIONS

This application is a continuation of U.S. patent application Ser. No. 10/955,137, filed Sep. 30, 2004, now U.S. Pat. No. 7,418,960 the details of which are hereby incorporated by reference as if fully set forth herein.

TECHNICAL FIELD

The present application relates to steam cookers and more particularly to a steam cooker including a steam superheater.

BACKGROUND

Steam cookers have been successfully employed by restaurants, hospitals and other food service operations to prepare quickly and conveniently large quantities of food. Increases in productivity and efficiency are regularly sought and therefore decreasing the time and energy needed to steam cook products would be desirable.

SUMMARY

In an aspect, a steam cooker includes a steam generator including a heating chamber defining a volume for holding water. A heat exchanger is associated with the heating chamber with the heat exchanger being configured to have hot gases pass therethrough in order to heat water in the heating chamber so as to generate steam. A steam superheater has a first passageway in communication with the heat exchanger to receive hot gases from the heat exchanger and a second passageway in communication with the heating chamber to receive steam from the heating chamber with the first and second passageways arranged in a heat exchange relationship where, in use, steam generated in the heating chamber travels along the second passageway while hot gases travel along the first passageway to superheat steam in the second passageway. A steam cooking chamber is in communication with the second passageway to receive superheated steam from the second passageway.

In another aspect, a steam cooker includes a steam generator including a heating chamber defining a volume for holding water. A heat exchanger is associated with the heating chamber, the heat exchanger configured to have hot gases pass therethrough in order to heat water in the heating chamber so as to generate steam. An exhaust stack is arranged to receive hot gases from the heat exchanger. A steam flow path receives steam from the heating chamber, the steam flow path arranged in a heat exchange relationship with the exhaust stack such that, in use, steam moving along the steam flow path is superheated by heat from hot gases traveling along the exhaust stack. A steam cooking chamber receives superheated steam from the steam flow path.

In another aspect, a method of cooking using superheated steam is provided. The method includes generating steam from water disposed in a boiler comprising a heating chamber and a heat exchanger disposed in the heating chamber where hot gases pass through the heat exchanger. The steam is superheated in a superheater having a first passageway in communication with the heat exchanger for receiving hot gases and a second passageway in communication with the heating chamber for receiving steam with the first and second passageways being in thermal communication such that steam traveling from the heating chamber along the second passageway is superheated by hot gases traveling from the heat exchanger along the first passageway. The superheated steam is introduced to a cooking chamber.

In another aspect, a steam cooker includes a steam generator including a heating chamber defining a volume for holding water and an on-board heat exchanger associated with the heating chamber. A steam path is in communication with the heating chamber to receive steam from the heating chamber and extends to a steam cooking chamber. An on-board heating mechanism located along the steam path for superheating steam traveling along the steam path to a temperature of between about 220 and 260 degrees F.

The use of superheated steam to cook food products can, in some cases, decrease cooking times and reduce the amount of energy consumed because the energy used to raise the temperature of the steam to the superheated state is energy that otherwise would have been lost through exhausted flue gases.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is a side view of an embodiment of a steam superheater.

FIG. 3 is a section view of the superheater of FIG. 2.

DETAILED DESCRIPTION

Figure 1:
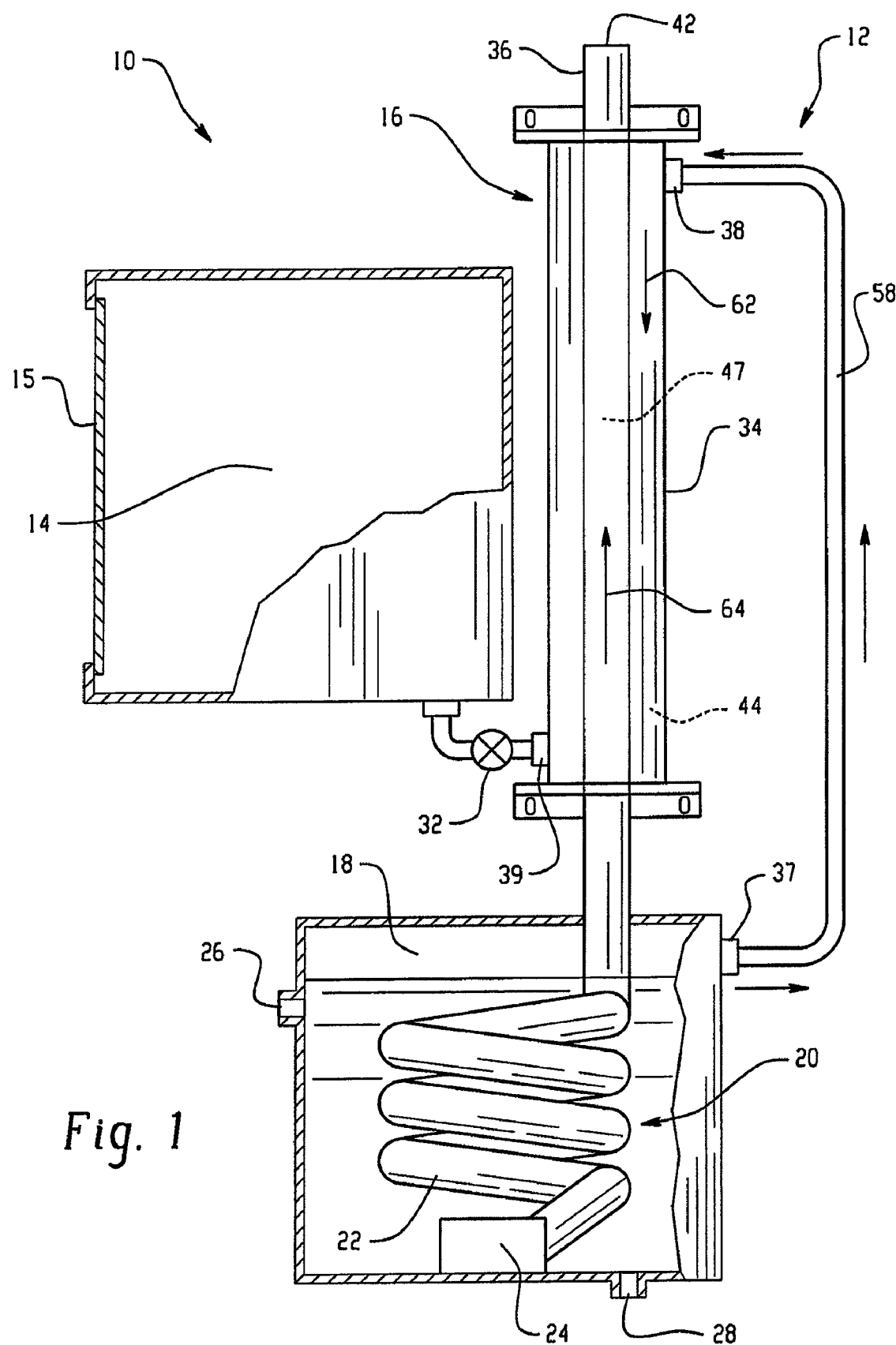
FIG. 1 is a diagrammatic illustration of an embodiment of a steam cooker including a steam superheater.

Referring to FIG. 1, a low-pressure steam cooker 10 includes a steam generator 12 for generating steam and a cooking chamber 14 that is in communication with the steam generator. The cooking chamber 14 is formed by an insulate housing and includes a door 15 movable between open and closed conditions. As will be described below, the steam generator 12 includes a heating chamber 18 where steam is generated and a steam superheater 16 capable of superheating the steam generated in the heating chamber under relatively low pressure conditions (e.g., in some embodiments, at most about five psi, such as about three psi).

Referring still to FIG. 1, disposed within the heating chamber 18 is a gas heat exchanger 20 in the form of a submerged heat exchange tube. As shown, heat exchanger 20 includes a helical portion 22, however, any suitable design can be used. The heat exchanger 20 is connected to a burner unit 24 (e.g., a metal fiber, fan-driven burner having a stainless steel mesh and stainless steel tube, such as a Model BCT0027, available from N.V. Acotech S.A., Kennesaw, Ga.) that is capable of generating hot gases for delivery to the heat exchanger. Heat exchanger 20 is located in the heating chamber 18 such that it can be in a heat exchange relationship with water disposed therein. While the illustrated heat exchange relationship with the water is via submersion of the heat exchanger, it is possible that hot gas could pass through ducts that are not submerged, such as ducts that run along the exterior wall of the heating chamber 18. The heating chamber 18 includes an inlet 26 for ingress of water into the heating chamber from a water source (not shown) and an outlet 28 for egress of water from the heating chamber (as when the chamber is to be drained).

A valve (not shown) controls water flow into the heating chamber, e.g., to maintain a desired water level within the heating chamber 18 during steam production. Disposed between the steam superheater 16 and cooking chamber 14 is a valve 32 that controls the flow rate of superheated steam into the cooking chamber (in some embodiments, the flow rate of superheated steam from steam superheater 16 into the cooking chamber is between about 35 and about 90 pounds per hour, such as about 50 pounds per hour where the volume of the cooking chamber is between about 164 and 245 cubic inches).

Referring now to FIGS. 2 and 3, steam superheater 16 includes an outer tube 34 and an inner tube 36 disposed within the outer tube. Outer tube 34 includes an inlet coupling 38 associated with a steam outlet 37 of the heating chamber 18 and an outlet coupling 39 associated with the cooking chamber 14 (FIG. 1). Inner tube 36 forms part of the exhaust stack of the steam generator and includes a gas inlet 40 fluidly connected to the heat exchanger 20 and an exhaust outlet 42 for the venting of combustion gases.

Referring particularly to FIG. 3, as shown, inner tube 36 is concentrically arranged within outer tube 34 to form a steam passageway 44 between the inner and outer tubes and about the periphery of the inner tube and an exhaust passageway 47 within the inner tube. In another embodiment, the steam passageway 44 might be located alongside, but not surrounding, the exhaust passageway 47, or the exhaust passageway 47 could surround the steam passageway 44. End caps 46 and 48 interconnect the inner tube 36 and the outer tube 34 and seal the passageway 44 formed therebetween from the atmosphere. The end caps 46, 48 each include a mounting plate 50 having a pair of openings 52, 54, e.g., for receiving a fastener, for use in mounting the steam superheater 16. Of course, other mounting means can be utilized, such as welding. A suitable method for connecting the inner and outer tubes to the end caps is welding, as an example.

In some embodiments, the inner tube 36 has an inner diameter $D_1$ of between about 2.5 and 5 inches, such as about 3 inches and an outer diameter $D_2$ of between about 3.5 and 5.5 inches, such as about 3.5 inches. In certain embodiments, the outer tube 34 has an inner diameter $D_1'$ of between about 3.5 and 5.5 inches, such as 4 inches and an outer diameter $D_2'$ of between about 4.5 and 6 inches, such as about 4.5 inches. The length L of the passageway 44 measured between end caps 46, 48 can be between about 20 and 30 inches, such as about 25 inches. These parameters are exemplary and can be varied depending on, for example, the desired steam temperatures and pressures and the size of the steam cooker. Any suitable material can be used to form the inner and outer tubes including, for example, food contact grade materials, such as stainless steel.

Referring back to FIG. 1, during use, the heating chamber 18 is filled with an amount of water (e.g., between about 10 and 15 gallons, such as about 13 gallons) through inlet 26. The combustion gases of burner unit 24 provide a temperature that is suitable to generate steam from the water disposed within the heating chamber 18. In some embodiments, the combustion gases are at a temperature of at least about 2000 degrees F, such as about 2100 degrees F. The combustion gases are introduced to the heat exchanger 20 where heat is transferred via the surface of the heat exchanger to the water disposed in the tank. When the combustion gases have traveled through the heat exchanger 20, the gases are exhausted through the inner tube 36 and out the exhaust outlet 42.

When the water reaches a temperature sufficient to generate steam, the steam exits steam outlet 37 and is directed to inlet coupling 38 along passageway 58. As steam travels along the passageway 44 in the direction of arrow 62, the combustion gases traveling along exhaust passageway 47 in the direction of arrow 64 heat the steam via heat transfer at the outer surface of tube 36. This counter flow arrangement, in some cases, may maintain a relative constant temperature differential (in some embodiments, a temperature differential of between about 800 and 1000 degrees F.) between the hot gases traveling along passageway 47 and steam traveling along passageway 44, which can provide more efficient steam superheating compared to a flow arrangement in which both the combustion gases and steam travel in the same direction. However, in some embodiments a counterflow arrangement may not be needed or feasible. Other flow arrangements are possible.

In some embodiments, a temperature of the steam traveling along the passageway 44 is increased at least about ten percent as it approaches the outlet coupling 37, e.g., to a temperature of between about 220 and 260 degrees F., such as about 240 degrees F. To increase the temperature of the steam, in some embodiments, the temperature of the gases entering the passageway 47 is between about 900 and 1200 degrees F., such as about 1000 degrees F. The superheated steam is then directed to the cooking chamber 14 along passageway 60 and the hot gases are vented from the exhaust passageway 47.

In other embodiments, multiple steam superheaters 16 can be provided to supply superheated steam to the cooking chamber 14. Further, a single steam superheater could be connected to feed superheated steam to more than one cooking chamber.

Figure 5:
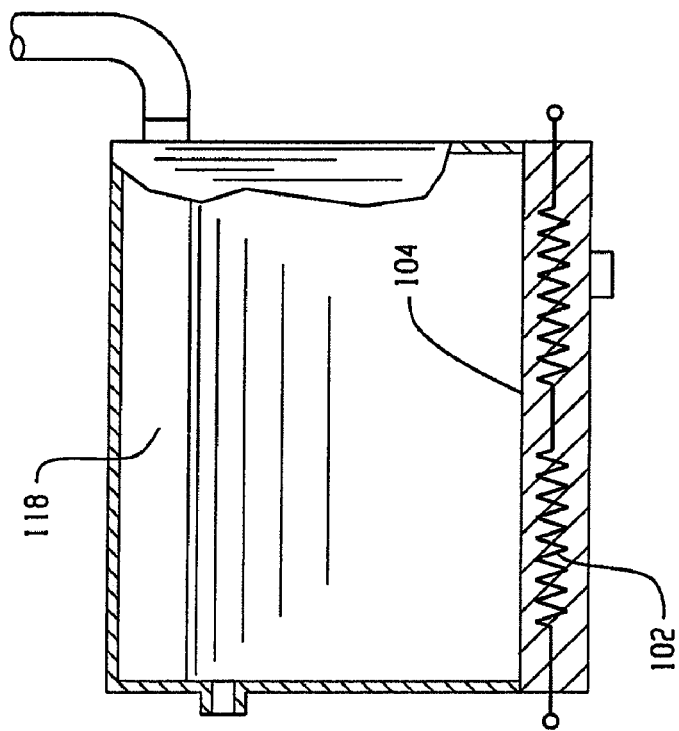
FIG. 5 illustrates another embodiment of a steam cooker heating chamber.
Figure 4:
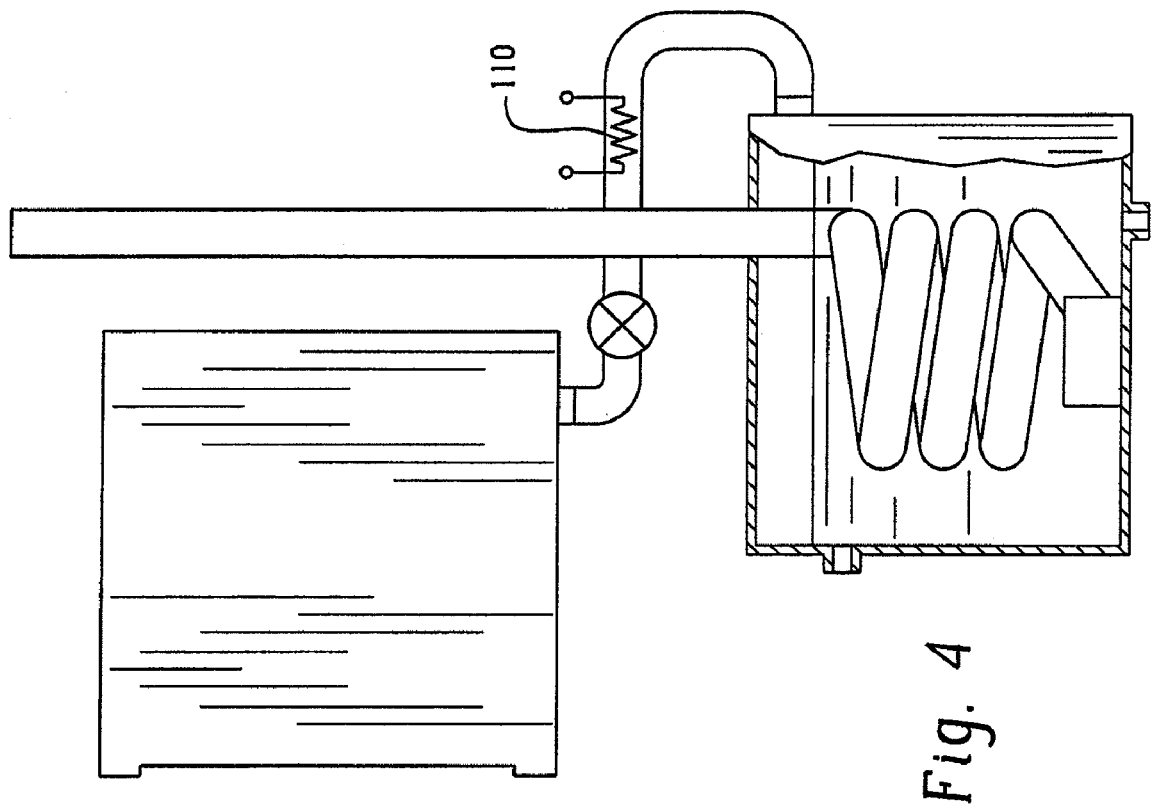
FIG. 4 is a diagrammatic illustration of another embodiment of a steam cooker including a steam superheater.

It is to be clearly understood that the above description is intended by way of illustration and example only and is not intended to be taken by way of limitation, and that changes and modifications are possible. For example, while the use of a heat exchanger that receives combustion gases is primarily described, units that utilize other types of heat exchangers could be provided. For example, reference is made to FIG. 5 in which a heating tank chamber 100 includes a submerged electrical, resistive heating element 102. The resistive element 102 could be contained within a heating plate 104 that makes up the bottom surface of the chamber 100. In such an embodiment the steamer would include a wall plug and related power supply for energizing the element 102. Further, while the use of combustion gases traveling along the exhaust stack is primarily described as being used for superheating the steam, in another embodiment, shown in FIG. 4, a resistive heating element 110 could be located along (either within as shown or external as in the case of a restive wire wound thereabout) the steam path leading from the heating tank to the steam cooking chamber for the purpose of superheating the steam. In such an embodiment the steamer would include a wail plug and related power supply for energizing the element 102, A combination of the heating tank of FIG. 5 and superheating arrangement of FIG. 4 could also be provided. An additional gas heating element could also be located for superheating the steam.

What is claimed is:

1. A steam cooker comprising:
   a steam generator including
      a heating chamber defining a volume for holding water;
      a heat exchanger associated with the heating chamber, the heat exchanger configured to have hot gases pass therethrough in order to heat water in the heating chamber so as to generate steam; and
   a steam superheater having a first passageway in communication with the heat exchanger to receive hot gases from the heat exchanger and a second passageway in communication with the heating chamber to receive steam from the heating chamber, the first and second passageways arranged in a heat exchange relationship;

wherein, in use, steam generated in the heating chamber travels along the second passageway while hot gases travel along the first passageway to superheat steam in the second passageway, the hot gases and the steam travel in a counter flow arrangement along the first and second passageways; and a steam cooking chamber in communication with the second passageway to receive superheated steam from the second passageway;

wherein the first passageway comprises an exhaust conduit in communication with the heat exchanger and the second passageway comprises a steam conduit in communication with the heating chamber;

wherein the exhaust conduit is disposed in the steam conduit, the second passageway defined between the steam conduit and the exhaust conduit;

wherein pressure in the heating chamber is at least about three psi while steam is being generated therein;

wherein steam traveling along the second passageway is heated to a temperature of between about 220 degrees F. and 260 degrees F.

2. The steam cooker of claim 1, wherein the exhaust conduit is disposed coaxially within the steam conduit.

3. The steam cooker of claim 1, wherein, in use, steam flows about a periphery of the exhaust conduit during superheating.

4. The steam cooker of claim 1, wherein only a portion of the exhaust conduit is disposed in the steam conduit.

5. The steam cooker of claim 1, wherein the exhaust conduit comprises at least part of an upright exhaust stack.

6. The steam cooker of claim 1, wherein an inlet of the steam conduit is spaced apart from an outlet of the steam conduit such that, in use, steam moving along the second passageway in a first direction from the inlet of the steam conduit toward the outlet of the steam conduit is superheated by hot gases traveling along the exhaust conduit in a second direction to provide the counter flow arrangement.

7. A steam cooker comprising:
a steam generator including
a heating chamber defining a volume for holding water;
a heat exchanger associated with the heating chamber, the heat exchanger configured to have hot gases pass therethrough in order to heat water in the heating chamber so as to generate steam at a pressure of no more than five psi;

an exhaust stack external of the heating chamber, the exhaust stack arranged to receive hot gases from the heat exchanger;

a steam flow conduit external of the heating chamber and arranged to receive steam produced within the heating chamber;

the exhaust stack extending within the steam flow conduit to form a steam superheating flow path between the external surface of the exhaust stack and the internal surface of the steam flow conduit, steam moving along the steam superheating flow path is superheated by heat from hot gases traveling along the exhaust stack to produce superheated steam at a temperature of between about 220 degrees F. and 260 degrees F.; and a steam cooking chamber arranged to receive superheated steam from the steam superheating flow path.

8. The steam cooker of claim 7 wherein the pressure at which steam is generated within the heating chamber is at least about 3 psi and no more than five psi.

9. A steam cooker comprising:
a steam generator including
a heating chamber defining a volume for holding water;
a heat exchanger associated with the heating chamber, the heat exchanger configured to have hot gases pass therethrough in order to heat water in the heating chamber;

an exhaust path external of the heating chamber, the exhaust path arranged to receive hot gases from the heat exchanger;

a steam flow path external of the heating chamber and arranged to receive steam produced within the heating chamber;

the exhaust path and the steam flow path arranged in a heat exchange relationship so that steam moving along the steam flow path is superheated by heat from hot gases traveling along the exhaust path to produce superheated steam at a temperature of between about 220 degrees F. and 260 degrees F.; and a steam cooking chamber arranged to receive superheated steam from the steam superheating flow path.

10. The steam cooker of claim 9 wherein the heat exchange relationship between the steam flow path and exhaust path comprises a counter flow arrangement.

* * * * *